(12) United States Patent
Orlik et al.

(10) Patent No.: US 8,472,304 B2
(45) Date of Patent: Jun. 25, 2013

(54) CARRIER ALLOCATION AND TIME SHARING FOR OFDMA/TDMA NETWORKS

(75) Inventors: Philip V. Orlik, Cambridge, MA (US); Qinghe Du, College Station, TX (US); Zafer Sahinoglu, Arlington, MA (US); Chunjie Duan, Medfield, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 214 days.

(21) Appl. No.: 12/503,169

(22) Filed: Jul. 15, 2009

(65) Prior Publication Data
US 2010/0246375 A1    Sep. 30, 2010

Related U.S. Application Data

(60) Provisional application No. 61/165,378, filed on Mar. 31, 2009.

(51) Int. Cl.
*H04J 11/00* (2006.01)
(52) U.S. Cl.
USPC .......................................................... 370/203
(58) Field of Classification Search
USPC ................. 370/203–211, 310, 312, 328–330, 370/342–348
See application file for complete search history.

(56) References Cited

U.S. PATENT DOCUMENTS

| 7,751,824 | B2 * | 7/2010 | Nonin et al. | 455/452.2 |
|---|---|---|---|---|
| 8,218,523 | B2 * | 7/2012 | Tao et al. | 370/346 |
| 8,218,661 | B2 * | 7/2012 | Bhatti et al. | 375/260 |
| 2007/0202816 | A1 * | 8/2007 | Zheng | 455/91 |
| 2008/0165743 | A1 * | 7/2008 | Palanki et al. | 370/335 |
| 2009/0003266 | A1 * | 1/2009 | Stolyar et al. | 370/328 |
| 2010/0015987 | A1 * | 1/2010 | Katori et al. | 455/450 |
| 2010/0142363 | A1 * | 6/2010 | Lee et al. | 370/203 |
| 2010/0166111 | A1 * | 7/2010 | Park et al. | 375/298 |
| 2010/0232335 | A1 * | 9/2010 | Lee et al. | 370/312 |

* cited by examiner

*Primary Examiner* — Dmitry H Levitan
(74) *Attorney, Agent, or Firm* — Dirk Brinkman; Gene Vinokur

(57) ABSTRACT

A method allocates bandwidth to channels in an orthogonal frequency division multiple access and time division multiple access (TDMA) network. The network includes a master device (master) communicating with a set of slave devices (slaves). The master defines a set $\Psi_m$ of logical indices $v$ of a set of N physical subcarriers for a set of M data streams to be allocated to a set of $N_d$ logical data subcarriers according to $$\Psi_m = \{v | v = iM+m, i=0,1,2,\ldots,d-1\},$$

where $d = N_d/M$. The set of N data subcarriers is mapped to the set of $N_d$ logical subcarriers according to the logical indices, and the data subcarriers are allocated to the logical subcarriers.

3 Claims, 4 Drawing Sheets

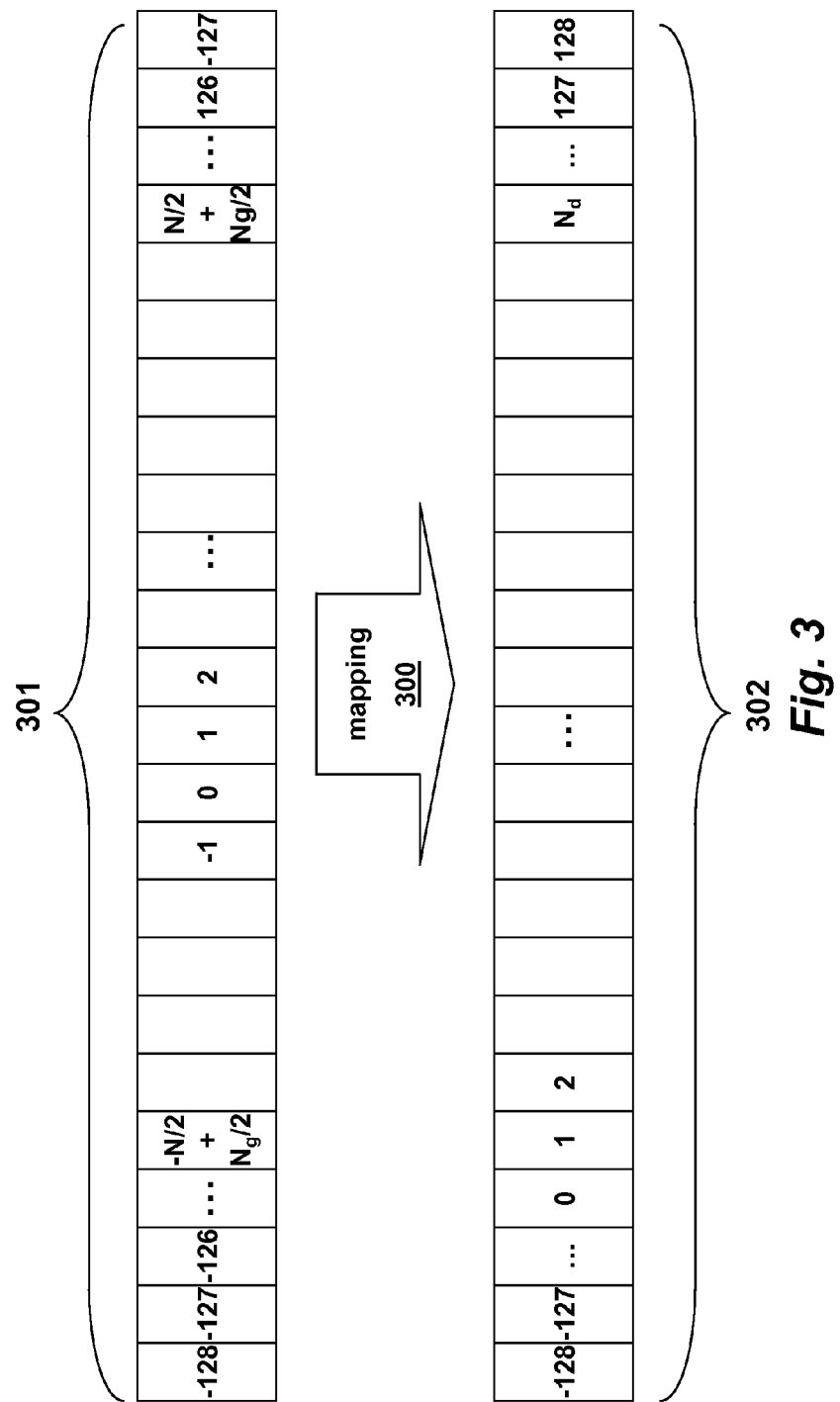

CARRIER ALLOCATION AND TIME SHARING FOR OFDMA/TDMA NETWORKS

RELATED APPLICATION

This Application claims priority to Provisional Application 61/165,378, "Carrier Allocation and Time Sharing FOR OFDMA/TDMA Networks," filed by Orlik on Mar. 31, 2009, and is also related to U.S. patent applications Ser. Nos. 12/347,087 and 12/359,470, all incorporated herein by reference.

FIELD OF INVENTION

The present invention relates to multiple access control (MAC) for wireless networks, more particularly to carrier allocation and transmission time sharing in orthogonal frequency division multiple access (OFDMA) and time division multiple access (TDMA) networks.

BACKGROUND OF THE INVENTION

In the related Application, we described a method and network that enable highly reliable communication between devices (transceivers). Along with reliability, the latency of communications between devices is also a key performance metric for many control and monitoring applications.

Typically, the network has a star topology. A master device (master) transmits commands, and receives status updates from slave devices (slaves).

In a star network, communications from the master to the slaves use downlink (DL) channel, and communications from the slaves to the master use an uplink (UL) channel. The time interval from the beginning of a broadcast polling message to the next polling message is called a superframe. The superframe interval is 10 ms to limit an overall response time from each slave to be less than 10 ms. There are four types of packets: broadcast polling, slave response, group acknowledgment (GACK) and response retransmission (Retx).

The superframe and packets are described in complete detail in the related Application, incorporated herein by reference.

Superframe

The superframe has two retransmission intervals. The Broadcast polling and GACK packets are on the DL channels, and the responses and Retx packets are on the uplink channel.

In wireless networks, the effects of multipath can cause severe degradation of the signal to noise ratio (SNR) due to destructive self interference of the echoes of the transmitted signal at the receiver. Orthogonal Frequency Division Modulation (OFDM) is a common method to decrease the multipath effects. Essentially, data are transmitted in a parallel fashion on a set of subcarriers, effectively transforming the wireless channel into a set of parallel communication channels. Each channel sees a time varying attenuation and phase rotation.

OFDM is specified by a number of wireless standards such as IEEE 802.11g, 802.11n and WiMAX. In the OFDM network, the bandwidth available for communications can be considered as a set of N parallel channels or subcarrier.

A label for each subcarrier is a physical index. As defined herein, a carrier (or subcarrier) is a frequency band. Each of these subcarriers is used to transmit a single modulation symbol which can be drawn from any modulation constellation. Binary phase shift keying (BPSK), quadrature phase shift keying (QPSK), 16 quadrature amplitude modulation (16 QAM) or 64 QAM are some examples of digital modulation formats that can be used.

The advantage of the OFDM network is that each subcarrier has a narrow bandwidth so that it receives on a simple flat fading channel. Additionally, one can transmit the same data (modulation symbols) over several subcarriers, and thus, obtain a frequency diversity gain. This assumes that the subcarriers have a frequency separation that is at least as large as the channel coherence bandwidth. Then, the receiver can perform a maximal ratio combining of the signals on each of the subcarriers to improve the received signal to noise ratio.

SUMMARY OF THE INVENTION

A method allocates bandwidth to channels in an orthogonal frequency division multiple access and time division multiple access (TDMA) network. The network includes a master device (master) communicating with a set of slave devices (slaves).

The master defines a set $\Psi_m$ of logical indices v of a set of N physical subcarriers for a set of M data streams to be allocated to a set of $N_d$ logical data subcarriers according to $$\Psi_m = \{v | v = iM+m, i=0,1,2,\ldots,d-1\},$$

where $d = N_d/M$.

The set of N data subcarriers is mapped to the set of $N_d$ logical subcarriers according to the logical indices, and the data subcarriers are allocated to the logical subcarriers.

BRIEF DESCRIPTION OF THE DRAWINGS

FIG. 3 is a block diagram of a mapping from physical subcarriers to logical subcarriers according to embodiments of the invention.

DETAILED DESCRIPTION OF THE PREFERRED EMBODIMENTS

Figure 1:
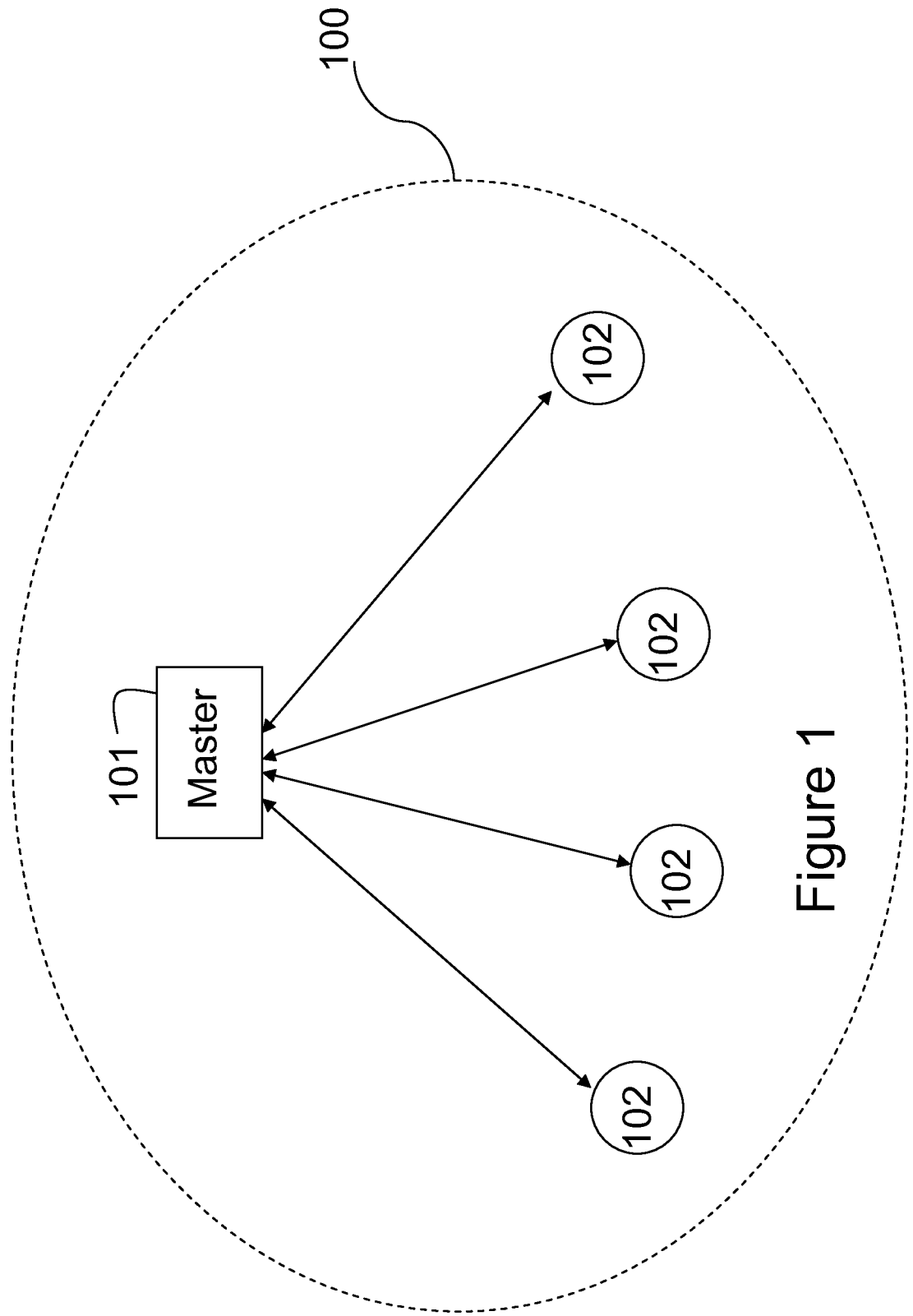
FIG. 1 is a schematic of a star network in which the embodiments of the invention operate.

FIG. 1 shows a network used by embodiments of the invention. The network is for applications where both highly reliable and low latency requirements are necessary. Specifically, we consider a network 100 including a single master device 101 communicating with a multiple slave devices 102. All messages or packets are either directly from the master to the slaves on downlink (DL) channels, or from directly from the slaves to the master on uplink (UL) channels. The master allocates subcarriers to the channels. A subcarrier being a frequency band.

Superframe Packets

Figure 2A:
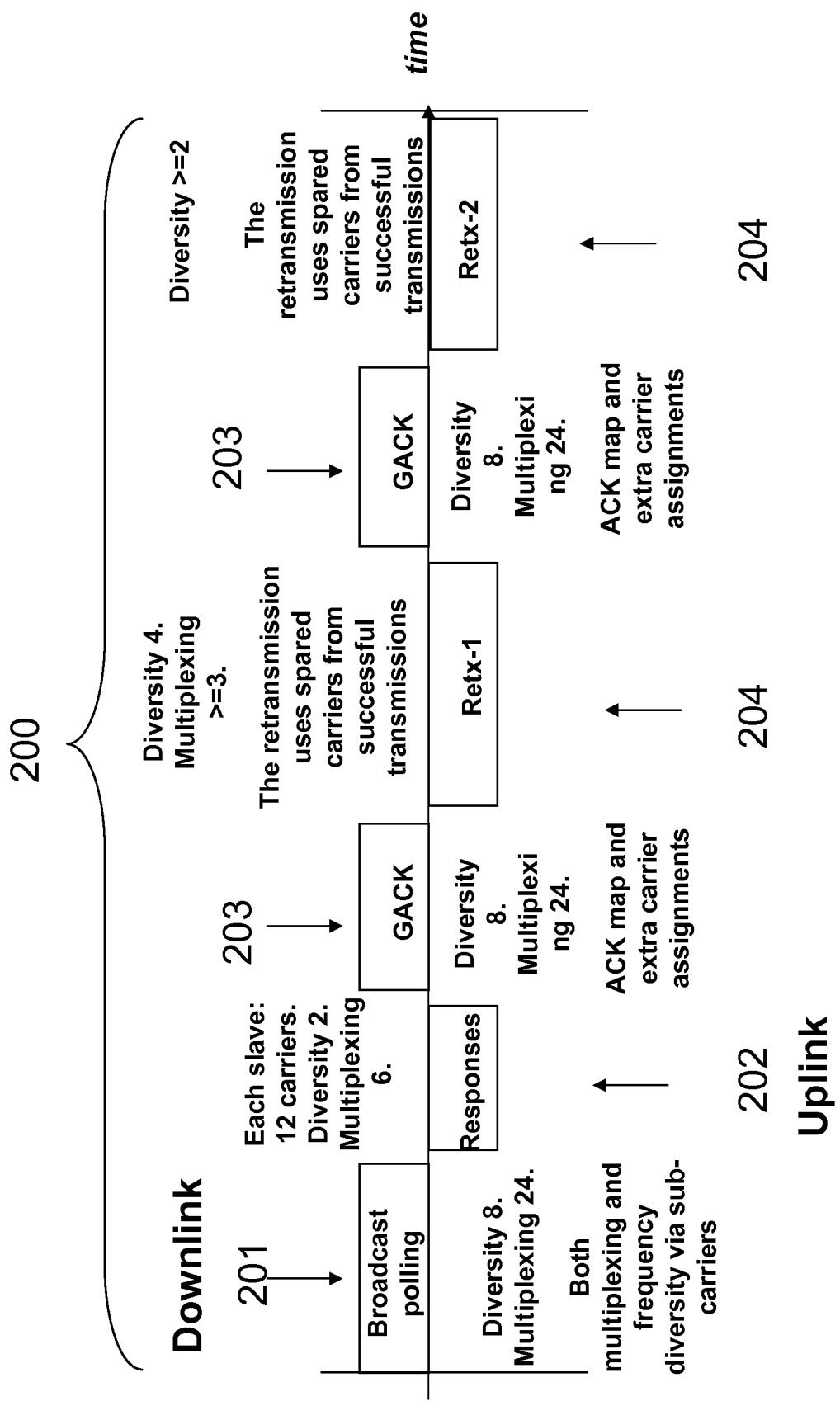
FIG. 2A is a block diagram of a superframe used by embodiments of the invention.

FIG. 2 shows the packets used by the superframe 200 according to embodiments of invention. The downlink packets are shown above the horizontal time, and the uplink packet below the line.

Broadcast Polling: 201

This packet is broadcast by the master to all the slaves.

Response: 202

This packet is transmitted by the slave devices in response to the broadcast polling request. The OFDMA allows the slaves to concurrently transmit their responses, because the slave uses subcarriers that are orthogonal to each other.

GACK 203

This packet is transmitted by the master to report to the slave devices successful receptions of their responses. In other words, the GACK serves as a group acknowledgment. Note that the slave responses are received concurrently at the master device. Therefore, sequential acknowledging is avoided to minimize time resource in the superframe.

Retx: 204

These packets are retransmitted copies of the failed slave response data. The packets differ from the original responses, because different coding, diversity order and multiplexing order may be applied during retransmissions.

In an uplink direction the transmission scheme is similar to the DL link with one modification. In the UL, the subcarriers are allocated among the slave devices 101, so that each slave is allocated a subset of the N subcarriers on which to transmit.

All slaves transmit simultaneously on their allocated subcarriers to the master. If there are K slave devices labeled consecutively 1, 2, . . . , K, then each slave can be allocated $$\left\lfloor \frac{N}{K} \right\rfloor$$

subcarriers for an initial response message.

During the next UL transmission interval in the ReTx-1 portion of the superframe, K' slaves may retransmit their responses due to a failed reception of the broadcast polling, message at the slave, or a failed reception of the initial response message at the master.

In either case, each slave that is retransmitting can be allocated a total of $$\left\lfloor \frac{N}{K'} \right\rfloor$$

subcarriers, where K'<K. Similarly for the second ReTx-2 message, we have K" slaves retransmitting, where K"≦K', and each of these slaves is allocated $$\left\lfloor \frac{N}{K''} \right\rfloor$$

subcarriers.

Ideally, subcarrier allocations for slaves maximizes the overall network capacity while minimizing control signaling and complexity, as described in the related Application.

A simpler approach, as described herein, minimizes the overhead associated with signaling the subcarrier allocations to the slave, and maximizes the frequency diversity for each slave.

To minimize the signaling, we consider a fixed resource allocation, where each slave is allocated a logical sub-channel, which includes a fixed set of subcarriers. To improve the frequency diversity at the slave, we constrain the grouping of subcarriers in each logical channel so that the subcarrier are maximally separated in frequency, preferably with a frequency spacing that is larger than the coherence bandwidth of the channel.

Before getting into the details of resource allocations, some definitions and terminologies are described.

Figure 2B:
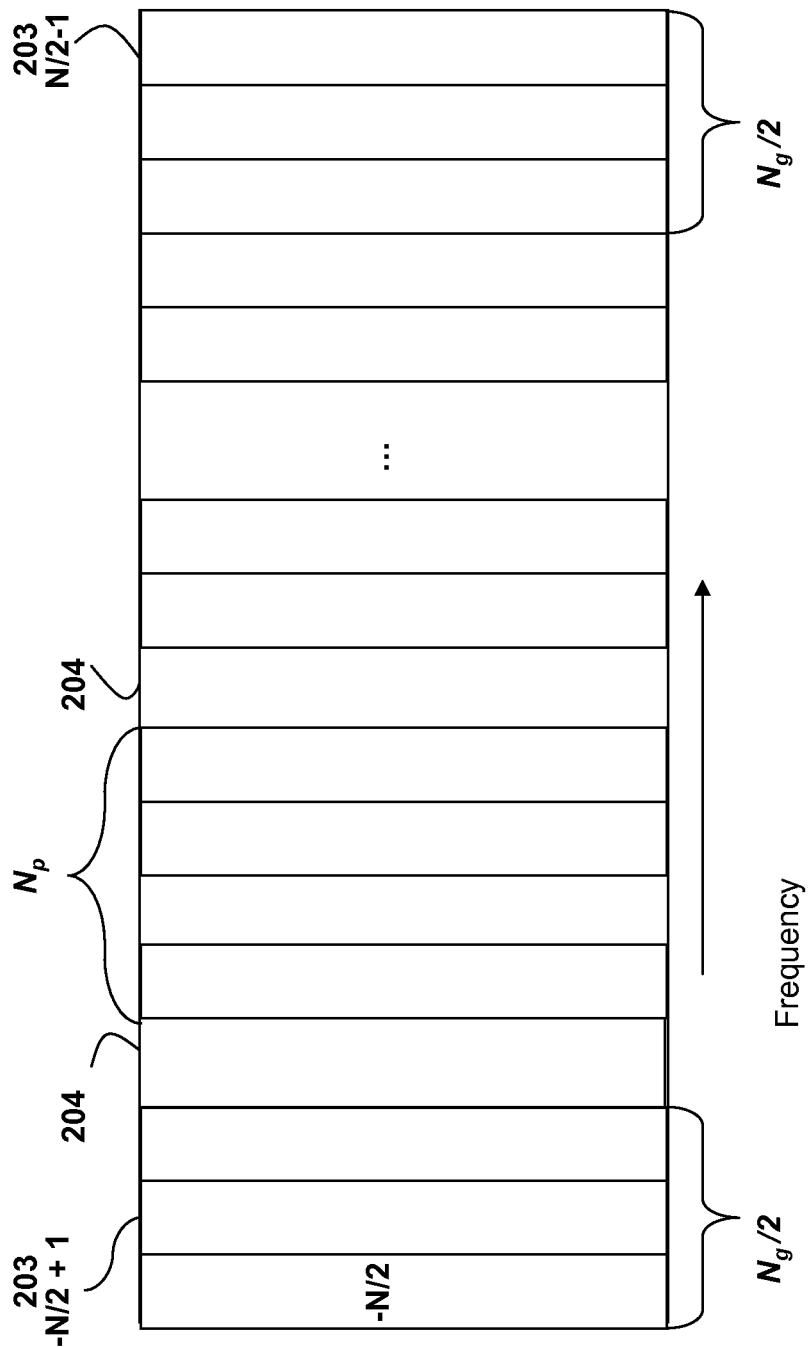
FIG. 2B is a block diagram of subcarrier allocation for an OFDM symbol according to embodiments of the invention.

FIG. 2B shows a more realistic version of the subcarrier allocation for an OFDM symbol. Here we have N physical subcarriers which have been labeled, with their physical index, from −N/2 to N/2−1.

We also consider subcarriers that are used as guard bands 203, which are not used but left idle during transmission. There are $N_g$ subcarriers are used for the guard bands 203 at the low and high ends of the bandwidth. Thus the subcarriers with physical indices [−N/2, −N/2+Ng/2] and [N/2−1−Ng/2, N/2] are reserved as guard subcarriers. In addition, the $0^{th}$ subcarrier, which corresponds to DC component, is not used for data transmission.

Pilot subcarriers 204 are used to transmit known signals for channel estimation and tracking. The pilot subcarriers are spaced uniformly through out the bandwidth with a spacing of $N_p$ subcarriers between the pilot subcarriers. Thus, we have a total of $N_d = N − N_g − N/N_p$ subcarriers available for allocation to the slaves. In the above equation $N_d$ denotes the number of data subcarriers.

The physical index of the pilot subcarriers are $$n_{pt} = \begin{cases} -N_0 + N_p(x+1) - 1 & \text{for } x = \frac{-N_{pt}}{2}, \frac{-N_{pt}}{2}+1, \ldots, -1 \\ N_0 + N_p(x-1) + 1 & \text{for } x = 1, 2 \ldots, \frac{N_{pt}}{2}+1, \frac{N_{pt}}{2}, \end{cases}$$

where $n_{pt}$ is the physical index of the pilot subcarrier, $N_0$ is an offset that defines the location of pilot within each contiguous set of $N_p$ sub-carriers, and $N_{pt}$ is the total number of pilots in the OFDM symbol, which is $N_{pt}=N/N_p$ Mapping Procedure As shown in FIG. 3, we define a logical subcarrier index, which is used to perform a mapping 300 of physical subcarriers 301 to logical subcarriers 302 for the allocation of subchannels to slaves. The logical index of data subcarriers is denoted by v, and is an integer in the range [0, $N_d$−1]. The mapping is accomplished by the following procedure.

```
t = 0;
    For n = 0 to N/2 −1 − N_g/2
    {
        Check if n is a pilot subcarrier
        If (n is a pilot subcarrier) then increment t;
        If ( n is not a pilot subcarrier)
            Allocate v(n) = t + offset;
            Increment t;
    }
    For n = −N/2 + N_g/2 to −1
    {
        Check if n is a pilot subcarrier
        If (n is a pilot subcarrier) then increment t;
        If ( n is not a pilot subcarrier)
        Allocate v(n) = t+offset;
        Increment t;
    }
```

At the end of this procedure, the vector v(n) contains the mapping from the $N_d$ subcarrier indices to the set [0, 1, . . . , $N_d$−1].

Multiplexing and Diversity

We use a logical index to describe the fixed resource allocation procedure. The resource allocation configures diverse multiplexing degree and diversity degree to balance the tradeoff between throughput and reliability. The definitions of multiplexing degree and diversity degree are given as follows.

Multiplexing Degree M

The transmitter, (master or slave) sends data over M parallel sub-streams. Each substream is also called a subchannel.

Diversity Degree d

Each multiplexing stream is replicated in d different logical data subcarriers to maximize the frequency diversity gain.

Logical Subcarrier Allocation for Downlink Transmissions

Each multiplexing stream is replicated in d different logical data subcarriers to achieve diversity gain. Thus, it is necessary to provide a procedure for subcarrier allocations, which are known to both the master and slaves. This enables simple signaling of the resource allocations to the slaves.

The general principle for subcarrier allocation is to separate the data subcarriers associated with the same logical channel as far as possible.

Define $\Psi_m$ as a set of logical indexes of all data subcarriers allocated to the $m^{th}$ logical channels, m=0, 1, 2, . . . , M−1. Then, $\Psi_m$ is $$\Psi_m = \{v | v = iM + m, i = 0, 1, 2, \ldots, d-1\},$$

for $$m = 0, 1, 2, \ldots, M-1,$$

where $d = N_d/M$.

Thus, the set $\Psi_m$ specifies the set of logical subcarriers, with logical indices separated by M logical indices. Thus, when assigning resources to slaves the master need only signal the index of the logical channel m (which corresponds to the set $\Psi_m$ of logical sub-carriers), that will carry data for the slave. Additionally the parameters M and d are broadcast to all slaves so the allocation of logical indices to logical channels is known.

Logical Subcarrier Allocation for Uplink Transmissions

We define $\Psi_{m,u}$ as the set of logical indexes of all subcarriers allocated to the $m^{th}$ logical channels of the $u^{th}$ slave. This slave has the $u^{th}$ smallest ID for all K receivers, m=0, 1, 2, . . . , M−1 and u=0, 1, 2, . . . , U−1, where U is the number of slaves who transmit.

In particular, the set $\Psi_{m,u}$ is $$\Psi_{m,u} = \{x | x = u + mU + iMU, i = 0, 1, \ldots, d-1\},$$

for $$m = 0, 1, \ldots, M-1, u = 0, 1, \ldots, U-1,$$

and where the following relationship between d, M, U holds, $$dMU = N_d.$$

During the response portion of the superframe, all K slaves transmit in the uplink and therefore U=K in the above directly equation. During the retransmission intervals of the superframe, the number of slaves transmitting is variable and therefore U=K' for the first retransmission and U=K" for the second retransmission. Thus, the master only signals the parameters M, d, and U in the GACK message. Then, each slave can determine the allocated logical subcarriers accordingly.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for allocating bandwidth to channels in an orthogonal frequency division multiple access and time division multiple access (TDMA) network, wherein the network includes a master device (master) communicating with a set of slave devices (slaves), wherein the master performs steps of the method, comprising the steps of:

defining a set $\Psi_m$ of logical indices v of a set of N physical subcarriers for a set of M data streams to be allocated to a set of $N_d$ logical data subcarriers according to $$\Psi_m = \{v | v = iM + m, i = 0, 1, 2, \ldots, d-1\},$$

where $d = N_d/M$, and m=0,1,2, . . . , M 1;

mapping the set of N physical subcarriers to the set of $N_d$ logical subcarriers according to the logical indices; and allocating the data subcarriers to the logical subcarriers.

2. The method of clam 1, further comprising:

broadcasting parameters M, d and U to the set of slave nodes, where U is the number of slaves nodes that transmit.

3. The method of claim 1, wherein the physical subcarriers include $N_p$ pilot subcarriers for pilot signals, and $N_g$ guard subcarriers, and wherein the pilot subcarrier are spaced uniformly through out the physical subcarriers, and wherein $N_d = N - N_g - N/N_p$.

* * * * *